United States Patent
Azam et al.

(10) Patent No.: US 11,209,890 B2
(45) Date of Patent: Dec. 28, 2021

(54) DETERMINING USER PRESENCE BASED ON SENSED DISTANCE

(71) Applicant: HEWLETT-PACKARD DEVELOPMENT COMPANY, L.P., Spring, TX (US)

(72) Inventors: Syed S Azam, Houston, TX (US); Wen Shih Chen, Taipei (TW); Christopher C Mohrman, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/482,344

(22) PCT Filed: Jul. 25, 2017

(86) PCT No.: PCT/US2017/043700
§ 371 (c)(1),
(2) Date: Jul. 31, 2019

(87) PCT Pub. No.: WO2019/022717
PCT Pub. Date: Jan. 31, 2019

(65) Prior Publication Data
US 2020/0142471 A1    May 7, 2020

(51) Int. Cl.
*G06F 1/32*     (2019.01)
*G06F 1/3231*   (2019.01)
*G06F 1/3296*   (2019.01)
*G06F 21/32*    (2013.01)
*G09G 5/10*     (2006.01)
*G06K 9/00*     (2006.01)

(52) U.S. Cl.
CPC .......... *G06F 1/3231* (2013.01); *G06F 1/3296* (2013.01); *G06F 21/32* (2013.01); *G09G 5/10* (2013.01); *G06K 9/00255* (2013.01); *G06K 9/00288* (2013.01); *G09G 2330/023* (2013.01)

(58) Field of Classification Search
None
See application file for complete search history.

(56) References Cited

U.S. PATENT DOCUMENTS

| | | | |
|---|---|---|---|
| 2003/0051182 A1* | 3/2003 | Tsirkel | G06F 1/3203 713/320 |
| 2003/0177402 A1 | 9/2003 | Piazza et al. | |
| 2004/0181702 A1 | 9/2004 | Cheng et al. | |
| 2007/0182538 A1* | 8/2007 | Ota | B60R 25/1009 340/506 |
| 2009/0160541 A1 | 6/2009 | Liu et al. | |
| 2012/0030752 A1* | 2/2012 | Bruno | G06F 21/32 726/16 |
| 2012/0218282 A1 | 8/2012 | Choboter et al. | |

(Continued)

OTHER PUBLICATIONS

22" Led-Backlit Eco-Friendly Widescreen Desktop Monitor W/ IPS Panel.

*Primary Examiner* — Danny Chan
(74) *Attorney, Agent, or Firm* — Dicke Billig & Czaja PLLC

(57) ABSTRACT

A method includes sensing, with a sensor, a distance of a user from a display of a computing device. The method further includes comparing, with the computing device, the sensed distance to a threshold distance, and determining, with the computing device, whether the user is present at the display based at least in part on the comparison.

17 Claims, 4 Drawing Sheets

(56) References Cited

U.S. PATENT DOCUMENTS

| | | | |
|---|---|---|---|
| 2013/0054997 A1 | 2/2013 | Wyatt et al. | |
| 2013/0057553 A1* | 3/2013 | Chakravarthula | G06F 3/0484 345/468 |
| 2013/0057573 A1* | 3/2013 | Chakravarthula | G06F 3/005 345/619 |
| 2013/0127619 A1* | 5/2013 | Konishi | G08B 21/22 340/540 |
| 2013/0214166 A1* | 8/2013 | Barlow | G01J 5/0025 250/342 |
| 2013/0219198 A1* | 8/2013 | Kuroishi | H04N 1/00896 713/310 |
| 2013/0248717 A1* | 9/2013 | Moore | G06F 21/00 250/341.8 |
| 2014/0028545 A1* | 1/2014 | Tsai | G09G 5/10 345/156 |
| 2014/0075230 A1* | 3/2014 | Suggs | H02J 7/35 713/323 |
| 2014/0114444 A1* | 4/2014 | Card | G05B 19/02 700/66 |
| 2014/0160294 A1* | 6/2014 | Naylor | G08B 13/19606 348/155 |
| 2014/0247695 A1* | 9/2014 | Vangeel | G01S 15/04 367/93 |
| 2014/0282877 A1 | 9/2014 | Mahaffey et al. | |
| 2014/0330560 A1* | 11/2014 | Venkatesha | G10L 15/26 704/235 |
| 2016/0026255 A1* | 1/2016 | Katz | H04N 5/23222 345/156 |
| 2017/0010654 A1 | 1/2017 | Chen | |
| 2017/0176578 A1 | 6/2017 | Rae et al. | |
| 2017/0289766 A1* | 10/2017 | Scott | H04W 4/023 |
| 2017/0328997 A1* | 11/2017 | Silverstein | G01S 13/765 |
| 2018/0041655 A1* | 2/2018 | Nakajima | G03G 15/5004 |
| 2018/0089493 A1* | 3/2018 | Nirenberg | H04N 19/85 |
| 2018/0157376 A1* | 6/2018 | Lemarchand | G01S 17/58 |
| 2018/0192195 A1* | 7/2018 | Du | H04R 3/00 |
| 2018/0292883 A1* | 10/2018 | Gatabi | G06F 1/1684 |
| 2019/0246172 A1* | 8/2019 | Cheong | G06F 1/32 |

* cited by examiner

DETERMINING USER PRESENCE BASED ON SENSED DISTANCE

BACKGROUND

Modern operating systems provide a comprehensive approach to system and device power management. Timer-based features may be used to provide power savings. For example, if user activity is absent for more than what the IT idle timer policy is, the system starts saving power by going into lower power states. The power saving starts when the IT policy threshold is reached.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Timer-based locks for displays have privacy issues and may waste host system resources. Most information technology (IT) policies set the idle timer to the 10-20 minutes range. If user activity is absent for more than what the IT idle timer policy is, the system starts saving power by going into lower power states. The power saving starts when the IT policy threshold is reached. In cases where the user comes back to the normal activity right after the IT idle threshold is reached, the savings is minimal. This approach of relying on IT defined policies may work when the user is idle for an extended period, but this approach is flawed as the device may still be wasting power during the first period where the IT threshold timer is not reached. Also, IT policies asking users to not leave the display open and unattended are difficult to enforce.

Some examples disclosed herein are directed to using presence sensors to detect the presence of a user to control a display's backlight, and to initiate user authentication (e.g., login/logout) on a host computing device. In some examples, a time of flight (ToF) sensor determines the distance of the user from the display. Some examples use multiple ToF sensors. In other examples, another type of sensor that is capable of measuring the distance of the user from the display may be used. When the sensor or sensors detect that the user has just approached the display, a user authentication process (e.g., login process) is automatically triggered. When the sensor or sensors detect that the user has moved away from the display, the brightness of the display is either immediately or progressively reduced to a dark or off state. Using ToF sensors to automate the screen dimming and initiate logoff and login automatically enhances productivity, increases power savings, and increases the life of the display backlight.

Figure 1:
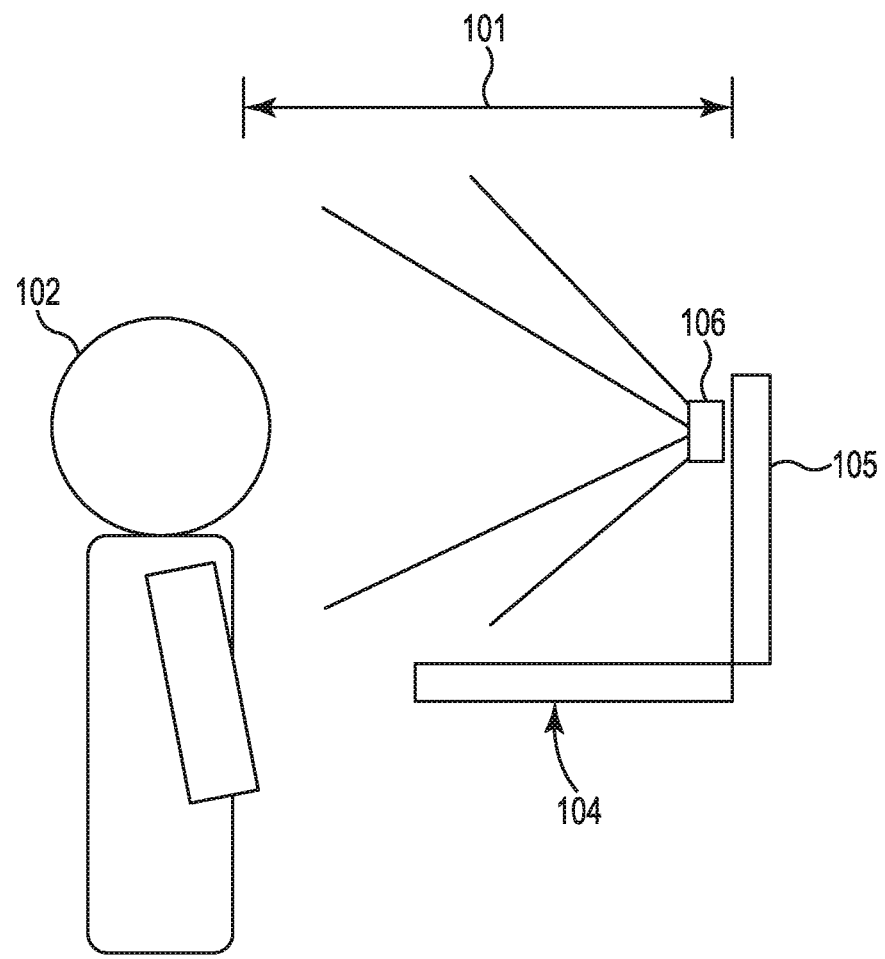
FIG. 1 is a diagram illustrating a computing device with presence detection capabilities according to one example.

FIG. 1 is a diagram illustrating a computing device 104 with presence detection capabilities according to one example. In the illustrated example, a presence sensor 106 is positioned on, or in close proximity to, a display 105 of the computing device 104. The sensor 106 may be connected to the computing device 104 via USB or directly to the device 104 using a sensor hub. In some examples, the presence sensor 106 includes a ToF sensor or another type of sensor that determines the distance 101 of a user 102 from the display 105. In some examples, the presence sensor 106 also generates a Boolean value that indicates whether the user 102 is currently present or not present within a range and a field of view (FOV) of the sensor 106. The presence sensor 106 may be a multi-zone ToF sensor that includes an array (e.g., 2×2, 3×3, 4×4, or user defined) of zones, and that determines separate distance values for each individual zone. In some examples, an on-screen display (OSD) menu may be used in display 105 to disable and enable the presence detection feature, and to select options for the presence detection feature.

Figure 2:
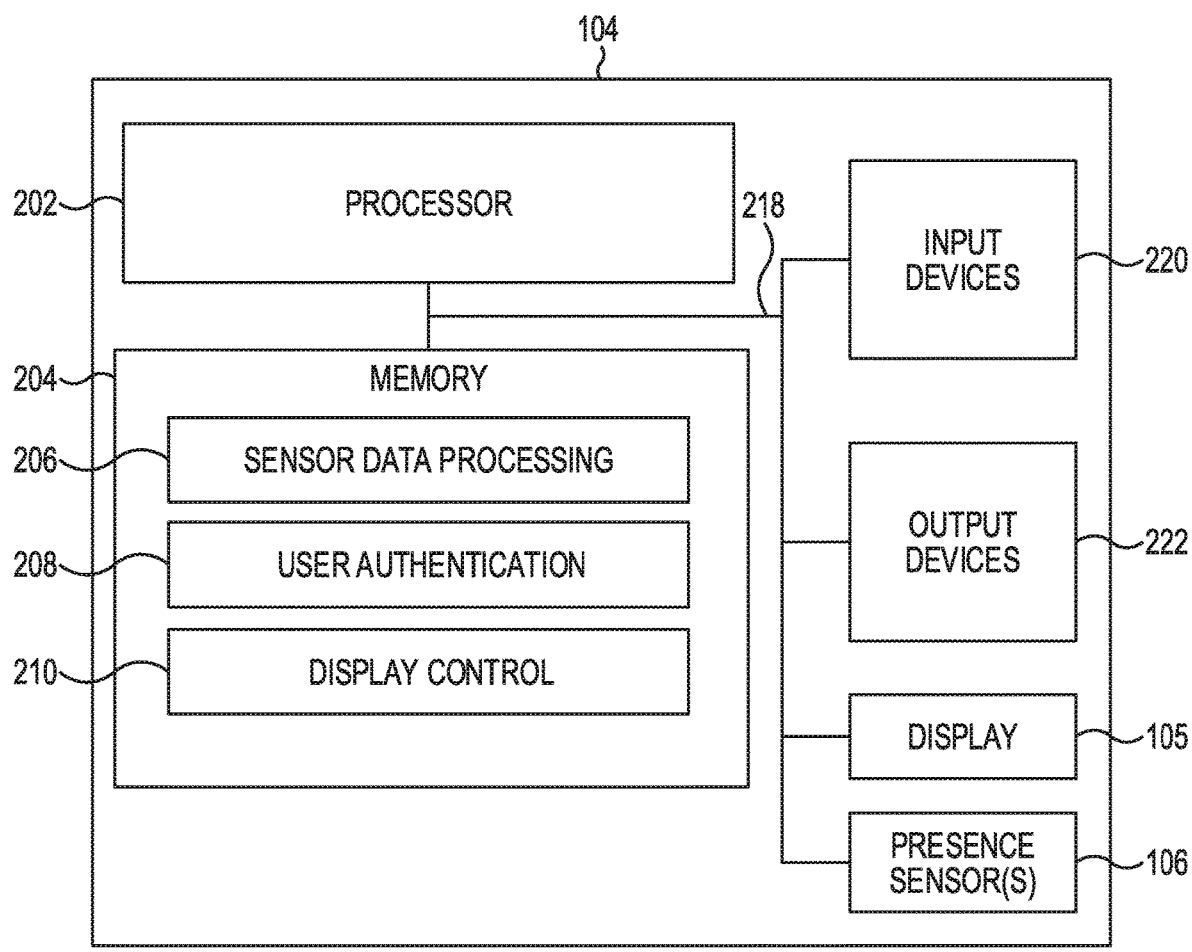
FIG. 2 is a block diagram illustrating elements of the computing device shown in FIG. 1 according to one example.

FIG. 2 is a block diagram illustrating elements of the computing device 104 shown in FIG. 1 according to one example. Computing device 104 includes at least one processor 202, a memory 204, input devices 220, output devices 222, display 105, and presence sensor 106. In the illustrated example, processor 202, memory 204, input devices 220, output devices 222, display 105, and presence sensor 106 are communicatively coupled to each other through communication link 218. The presence sensor 106 can be embedded within the frame of the display 105, mounted along at least one of the edges of the display 105, or mounted in a suitable location in the room in which the display 105 is located.

Input devices 220 include a keyboard, mouse, data ports, and/or other suitable devices for inputting information into device 104. Output devices 222 include speakers, data ports, and/or other suitable devices for outputting information from device 104.

Processor 202 includes a Central Processing Unit (CPU) or another suitable processor. In one example, memory 204 stores machine readable instructions executed by processor 202 for operating device 104. Memory 204 includes any suitable combination of volatile and/or non-volatile memory, such as combinations of Random Access Memory (RAM), Read-Only Memory (ROM), flash memory, and/or other suitable memory. These are examples of non-transitory computer readable storage media. The memory 204 is non-transitory in the sense that it does not encompass a transitory signal but instead is made up of at least one memory component to store machine executable instructions for performing techniques described herein.

Memory 204 stores sensor data processing module 206, user authentication module 208, and display control module 210. Processor 202 executes instructions of modules 206, 208, and 210 to perform the techniques described herein. It is noted that some or all of the functionality of modules 206, 208, and 210 may be implemented using cloud computing resources.

In examples that use multiple ToF sensors 106, the individual ToF sensors may be enumerated separately, and each sensor 106 reports a presence detection Boolean value and a distance value to the computing device 104 at a predefined time interval. In one example, the Boolean values and distance values are provided to the sensor data processing module 206 for processing. For the examples that use multiple ToF sensors 106, the sensor data processing module 206 may assume that the user 102 is present as long as the presence detection Boolean value of at least one of the sensors 106 indicates that the user 102 is present, and may assume that the user 102 is no longer present when the presence detection Boolean value of all of the sensors 106 indicate that the user 102 is not present. For examples that use a single ToF sensor 106, the sensor data processing module 206 may assume that the user 102 is present as long as the presence detection Boolean value of the single sensor 106 indicates that the user 102 is present, and may assume that the user 102 is no longer present when the presence detection Boolean value of the single sensor 106 indicates that the user is not present.

Even in cases in which the presence detection Boolean value from the sensor 106 indicates that the user 102 is present, the sensor data processing module 206 may conclude that the user 102 is not present based on the distance data. The sensor data processing module 206 compares the distance data received from the sensor 106 to a presence distance threshold value. If a received distance value is less than the threshold value, the module 206 may assume that the user 102 is present. If the received distance value is greater than the threshold value, the module 206 may assume that the user 102 is not present. In some examples, the presence distance threshold value may be defined by the user 102 (e.g., via the OSD menu of display 105).

In some examples, when the user 102 approaches the computing device 104 when the device 104 is in a low power state (e.g., sleep state), the sensor 106 will detect the presence of the user 102, which triggers an automatic start of a user authentication process (e.g., manual login process using pin/password, or an automatic process with Bluetooth (BT) authentication or automatically triggering a camera for face recognition). The BT authentication may use the cell phone of a user 102 as an authentication token, so that if the user 102 is detected as being present and has his or her cell phone in close proximity, the user 102 is automatically authenticated. When the sensor data processing module 206 determines based on the received sensor data that the user 102 was previously not present and is now, currently present, the module 206 signals the display control module 210 to increase the brightness of the display 105 and cause the computing device 104 to wake from the low power state. The module 206 also signals the user authentication module 208 to begin the user authentication process.

For a user leaving scenario, the response may be user defined (e.g., via the OSD menu of display 105) to cause the brightness of the display 105 to either immediately or progressively be reduced to a dark or off state. For the immediate case, the sensor 106 will detect the lack of presence of the user 102 and will report this information to the sensor data processing module 206. The sensor data processing module 206 then informs the display control module 210 of the lack of user presence. In response, the display control module 210 causes the display 105 to go dark immediately. The display control module 210 also generates a lock signal that causes the computing device 104 to be locked (i.e., locked such that user authentication will be subsequently triggered to unlock the device 104), and causes the computing device 104 to enter a low power state.

For the progressive case according to some examples, the brightness of the display 105 is reduced in stages. In a first stage, after the user 102 has been absent for more than a first period of time (e.g., 10 seconds), the display control module 210 reduces the display brightness by 30% from the last user settings (note that a user setting may already be at reduced level). In a second stage, after the user 102 has been absent for more than a second period of time (e.g., 20 seconds total), the display control module 210 reduces the display brightness another 20%. If the user 102 returns to the computing device 104 (before the third stage) and is sensed as being present, the display control module 210 gradually increases the display brightness in increments (e.g., increments of 5% per quarter second), without further authentication, until the full brightness level is restored.

In a third stage, after the user 102 has been absent for a third period of time (e.g., X seconds, where X is an integer greater than 20), the display control module 210 progressively reduces the display brightness another X % until a maximum reduction in display brightness has been achieved. At this time, a lock signal is generated by the display control module 210 to lock the computing device 104. If the user 102 comes back before the maximum brightness reduction has been reached and is sensed as being present, the display control module 210 gradually increases the display brightness in increments (e.g., increments of 5% per quarter second), without further authentication, until the full brightness level is restored. If the user 102 does not come back before the maximum brightness reduction has been reached and the device 104 has been locked, resumption of user presence at this point triggers the authentication process.

In some examples, computing device 104 uses multiple distance thresholds, and varies the rate of dimming of the display 105 based on the multiple thresholds. For example, if the user 102 is sensed as being beyond a first distance threshold, which is the shortest distance threshold, display control module 210 may dim the display 105 at a first rate, which may be the slowest rate of dimming. If the user 102 is sensed as being beyond a second distance threshold, which is a longer distance than the first distance threshold, the display control module 210 may dim the display 105 at a second rate, which may be faster than the first rate. If the user 102 is sensed as no longer being present (e.g., the user 102 is sensed as being beyond the presence distance threshold, which is a longer distance than the second distance threshold), the display control module 210 may dim the display 105 at a third rate, which may be faster than the second rate.

In some examples, the distance thresholds may vary based on the lateral position of the user 102 with respect to the display 105. For example, the distance thresholds for positions on the left and right sides of the display 105 may be the same, but may be different than the distance threshold for positions near the center of the display 105. In one example, display control module 210 may dim the display 105 when the user 102 is just beyond the edge of the display 105, but may use a higher distance threshold when the user 102 is positioned near the center of the display 105. Also, each different position (e.g., left, center, right) with respect to the display 105 may have multiple distance thresholds, and the distance thresholds and dimming rates may vary for the various positions.

In some examples, computing device 104 generates an audible and/or visual warning signal when the user 102 is detected as being too close to the display of the computing device 104. In particular, if sensor data processing module 206 determines that a distance value provided by sensor 106 is less than a threshold value (e.g., 50 mm), module 206 causes the display 105 and/or at least one of the output devices 222 to generate the warning signal. This feature provides protection for the user's eyes, which could be damaged by prolonged exposure at close range. The sensor data processing module 206 may also keep track of the length of time that the user 102 has been present in front of the display 105, and cause an audible and/or visual warning signal to be generated when this time exceeds a predetermined threshold.

In some examples, the sensor data processing module 206 causes the distance values received from sensor 106 to be displayed on the display 105. This displayed information may be used, for example, to assist a user in moving to an appropriate distance for facial recognition. In some examples, based on the distance values received from the sensor 106, the sensor data processing module 206 causes adjustments to be made to at least one of the input devices 220 and the output devices 222 (e.g., making adjustments to the speakers and microphone of the device 104 based on the sensed distance of the user 102). Such adjustments may include, for example, changing a mode of these devices, increasing the volume as the user 102 moves farther away from the device 104, and/or decreasing the volume as the user 102 moves closer to the device 104. In some examples, based on the distance values received from the sensor 106, the sensor data processing module 206 causes changes to the display characteristics of the display 105 (e.g., increasing the font size as the user 102 moves farther away from the display 105, and decreasing the font size as the user moves closer to the display 105). The sensor 106 may also be used to detect hand gestures (e.g., a tap gesture or a swipe gesture) made by the user 102, and the sensor data processing module 206 may cause an action to be performed based on the detected gesture.

In some examples, sensor 106 includes a lower power mode and a higher power mode. In the lower power mode, the sensor 106 uses less power and checks for the presence of the user 102 less frequently than in the higher power mode. In some examples, when the sensor 106 detects that the user 102 is present, the sensor 106 operates in the lower power mode, and when the sensor 106 detects that the user 102 is no longer present, the sensor 106 is automatically switched to the higher power mode to check for the presence of the user 102 more frequently.

Figure 3C:
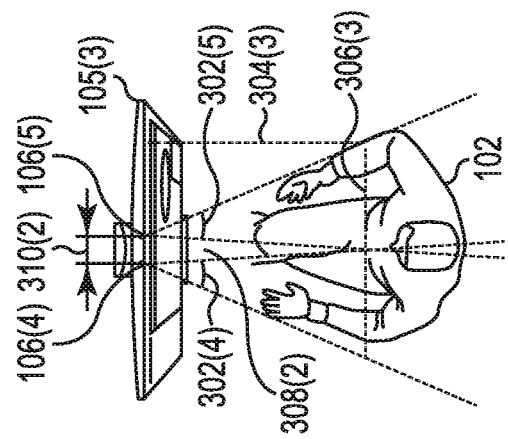
FIGS. 3A-3C are diagrams illustrating example presence sensor configurations.
Figure 3B:
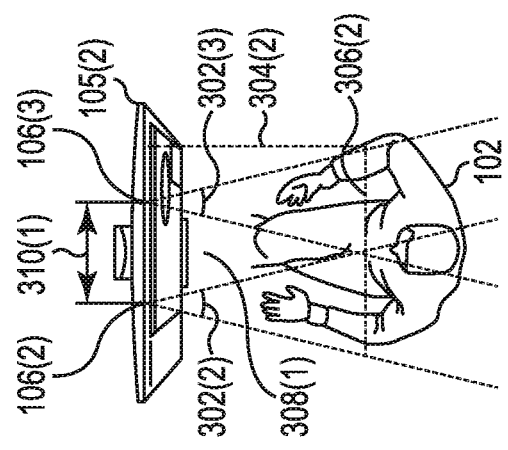
Figure 3A:
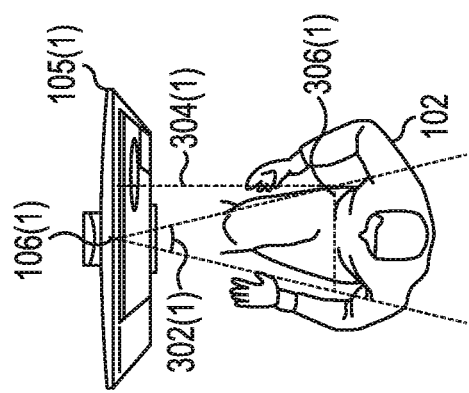

FIGS. 3A-3C are diagrams illustrating example presence sensor configurations. As shown in FIG. 3A, the display 105(1) includes a single presence sensor (e.g., ToF sensor) 106(1). The presence sensor 106(1) has a field of view (FOV) 302(1) of about 27 degrees. The center line of the FOV 302(1) is perpendicular or substantially perpendicular to the display 105(1). The user 102 is positioned at a distance 304(1) of about 60 cm from the display 105(1). The lateral length 306(1) of the FOV 302(1) at this distance (and correspondingly the lateral detectable range of the user 102) is about 29 cm. The lateral detectable range may be increased by using multiple presence sensors 106, as shown in FIGS. 3B and 3C.

As shown in FIG. 3B, the display 105(2) includes two presence sensors (e.g., ToF sensors) 106(2) and 106(3), which are positioned a distance 310(1) of about 29 cm apart. The presence sensors 106(2) and 106(3) have a FOV 302(2) and a FOV 302(3), respectively, which are each about 27 degrees. The center lines of the FOVs 302(2) and 302(3) are perpendicular or substantially perpendicular to the display 105(2). The user 102 is positioned at a distance 304(2) of about 60 cm from the display 105(2). The lateral length 306(2) of the combined FOVs 302(2) and 302(3) at this distance (and correspondingly the lateral detectable range of the user 102) is about 58 cm. There is a dead zone 308(1) extending outward from the display 105(2) between the FOVs 302(2) and 302(3) of the two presence sensors 106(2) and 106(3), where presence of the user 102 is not detectable. The size of the dead zone may be reduced by adjusting the angle of the sensors 106, as shown in FIG. 3C.

As shown in FIG. 3C, the display 105(3) includes two presence sensors (e.g., ToF sensors) 106(4) and 106(5), which are positioned a distance 310(2) of about 10 cm apart. The presence sensors 106(4) and 106(5) have a FOV 302(4) and a FOV 302(5), respectively, which are each about 27 degrees. The center lines of the FOVs 302(4) and 302(5) are perpendicular or substantially perpendicular to the display 105(3). The user 102 is positioned at a distance 304(3) of about 60 cm from the display 105(3). The lateral length 306(3) of the combined FOVs 302(4) and 302(5) at this distance (and correspondingly the lateral detectable range of the user 102) is about 58 cm. There is a dead zone 308(2) extending outward from the display 105(3) between the FOVs 302(4) and 302(5) of the two presence sensors 106(4) and 106(5), where presence of the user 102 is not detectable. By reducing the distance 310 between the sensors 106 and angling the sensors 106 outward, as shown in FIG. 3C, the size of the dead zone 308(2) is reduced, compared to the size of the dead zone 308(1) shown in FIG. 3B, while still providing the same lateral detectable range.

The use of multiple presence sensors 106 with distance detection helps the system to distinguish between a human and non-human objects (e.g., a chair or a coffee mug), and provides for a more accurate tracking of the user 102, including being able to determine a direction that the user 102 has moved away from the display 105 (e.g., whether the user has exited to the left of the display or to the right of the display). Some examples determine whether an object is moving based on the sensed distance of the object over time, which helps the system to distinguish between human and non-human objects.

Figure 4:
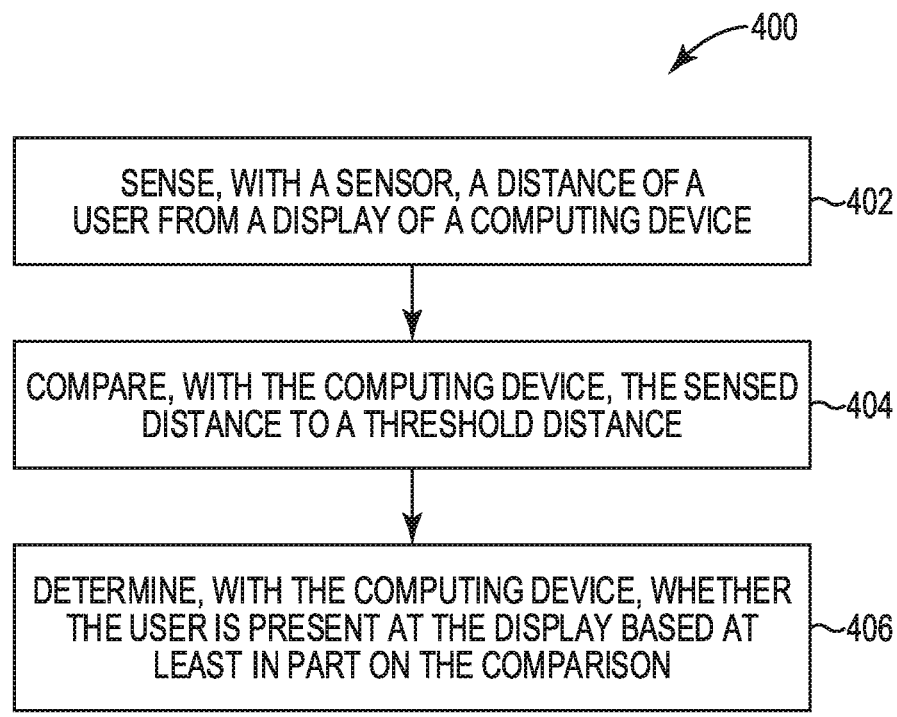
FIG. 4 is a flow diagram illustrating a method for detecting user presence according to one example.

One example is directed to a method for detecting user presence. FIG. 4 is a flow diagram illustrating a method 400 for detecting user presence according to one example. In one example, computing device 104 (FIG. 1) may perform method 400. At 402 in method 400, a sensor senses a distance of a user from a display of a computing device. At 404, the computing device compares the sensed distance to a threshold distance. At 406, the computing device determines whether the user is present at the display based at least in part on the comparison.

In some examples, method 400 may further include reporting, with the sensor, to the computing device, the sensed distance; and reporting, with the sensor, to the computing device, a Boolean value that indicates whether the user is present within a field of view of the sensor. Method 400 may further include causing an automatic reduction in brightness of the display when it is determined by the computing device that the user is not present at the display. The brightness of the display may be immediately reduced to a dark state when it is determined by the computing device that the user is not present at the display. The brightness of the display may be progressively reduced in stages to a dark state when it is determined by the computing device that the user is not present at the display.

In some examples, method 400 may further include causing the computing device to be locked when it is determined by the computing device that the user is not present at the display. Method 400 may further include triggering a user authentication process after the computing device is locked when it is determined by the computing device that the user is present at the display. The user authentication process may be an automatic authentication process that uses a camera for face recognition. The user authentication process may be an automatic authentication process that uses Bluetooth authentication.

Another example is directed to a system that includes a computing device including a display, and a sensor to sense a distance of a user from the display. The system further includes at least one processor in the computing device to: compare the sensed distance to a threshold distance; and determine whether the user is present at the display based at least in part on the comparison.

In some examples, the sensor may include a plurality of time of flight (ToF) sensors that each sense a distance of the user from the display. At least one of the ToF sensors may be a multi-zone ToF sensor that includes an array of zones and that determines a separate distance value for each of the zones. The sensor may include a lower power state and higher power state, and wherein the sensor checks for presence of the user more frequently in the higher power state than in the lower power state.

Yet another example is directed to a non-transitory computer-readable storage medium storing instructions that, when executed by at least one processor, cause the at least one processor to: receive, from a sensor, a distance value representing a distance of a user from a display of a computing device, and a Boolean value that indicates whether the user is present within a field of view of the sensor; and determine whether the user is present at the display based on the received distance value and the received Boolean value.

The non-transitory computer-readable storage medium may further store instructions that, when executed by the least one processor, cause the at least one processor to reduce brightness of the display when it is determined that the user is not present at the display.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A method, comprising:
sensing, with a plurality of sensors, a distance of a user from a display of a computing device, wherein the plurality of sensors forms a combined field of view;
comparing, with the computing device, the sensed distance to a threshold distance;
distinguishing the user from non-human objects within the combined field of view based on changes in the sensed distance over time; and
determining, with the computing device, whether the user is present at the display based at least in part on the comparison and the distinguishing, wherein the computing device is to determine that the user is not present at the display when the sensed distance is greater than the threshold distance;
comparing, with the computing device, the sensed distance to a plurality of threshold distances; and
causing an automatic reduction in brightness of the display based on the comparison of the sensed distance to the plurality of threshold distances, wherein a rate at which the automatic reduction in brightness occurs varies for each of the threshold distances.

2. The method of claim 1, and further comprising:
reporting, with the plurality of sensors, to the computing device, the sensed distance; and
reporting, with the plurality of sensors, to the computing device, a Boolean value that indicates whether the user is present within the combined field of view of the plurality of sensors.

3. The method of claim 1, and further comprising:
causing an automatic reduction in brightness of the display when it is determined by the computing device that the user is not present at the display.

4. The method of claim 3, wherein the brightness of the display is immediately reduced to a dark state when it is determined by the computing device that the user is not present at the display.

5. The method of claim 3, wherein the brightness of the display is progressively reduced in stages to a dark state when it is determined by the computing device that the user is not present at the display.

6. The method of claim 1, and further comprising:
causing the computing device to be locked when it is determined by the computing device that the user is not present at the display.

7. The method of claim 6, and further comprising:
triggering a user authentication process after the computing device is locked when it is determined by the computing device that the user is present at the display.

8. The method of claim 7, wherein the user authentication process is an automatic authentication process that uses a camera for face recognition.

9. The method of claim 7, wherein the user authentication process is an automatic authentication process that uses Bluetooth authentication.

10. The method of claim 1, further comprising:
orienting each sensor of the plurality of sensors, wherein the orienting reduces a size of a dead zone within the combined field of view.

11. The method of claim 10, the orienting comprising:
adjusting an angle of each of the sensors of the plurality of sensors, in relation to each of the sensors of the plurality of sensors and the display.

12. The method of claim 1, and further comprising:
identifying, with the computing device, a lateral position of the user with respect to the display based on the sensing with the plurality of sensors within the combined field of view; and
causing an automatic reduction in brightness of the display based on the identified lateral position of the user.

13. The method of claim 1, and further comprising:
identifying, with the computing device, a lateral position of the user with respect to the display based on the sensing with the plurality of sensors within the combined field of view;
comparing, with the computing device, the sensed distance to a first threshold distance when the identified lateral position is near a center of the display; and
comparing, with the computing device, the sensed distance to a second threshold distance different than the first threshold distance when the identified lateral position is near an edge of the display.

14. A system comprising:
a computing device including a display;
a plurality of sensors to sense a distance of a user from the display, wherein the plurality of sensors forms a combined field of view; and at least one processor in the computing device to:
compare the sensed distance to a threshold distance;
distinguish the user from non-human objects within the combined field of view based on changes in the sensed distance over time; and
determine whether the user is present at the display based at least in part on the comparison and the distinguishing, wherein the processor is to determine that the user is not present at the display when the sensed distance is greater than the threshold distance;
compare the sensed distance to a plurality of threshold distances; and
cause an automatic reduction in brightness of the display based on the comparison of the sensed distance to the plurality of threshold distances, wherein a rate at which the automatic reduction in brightness occurs varies for each of the threshold distances.

15. The system of claim 14, wherein the plurality of sensors includes a plurality of time of flight (ToF) sensors that each sense a distance of the user from the display.

16. The system of claim 15, wherein at least one of the ToF sensors is a multi-zone ToF sensor that includes an array of zones and that determines a separate distance value for each of the zones.

17. The system of claim 14, wherein the plurality of sensors includes a lower power state and higher power state, and wherein the plurality of sensors checks for presence of the user more frequently in the higher power state than in the lower power state.

\* \* \* \* \*